Figure 1:
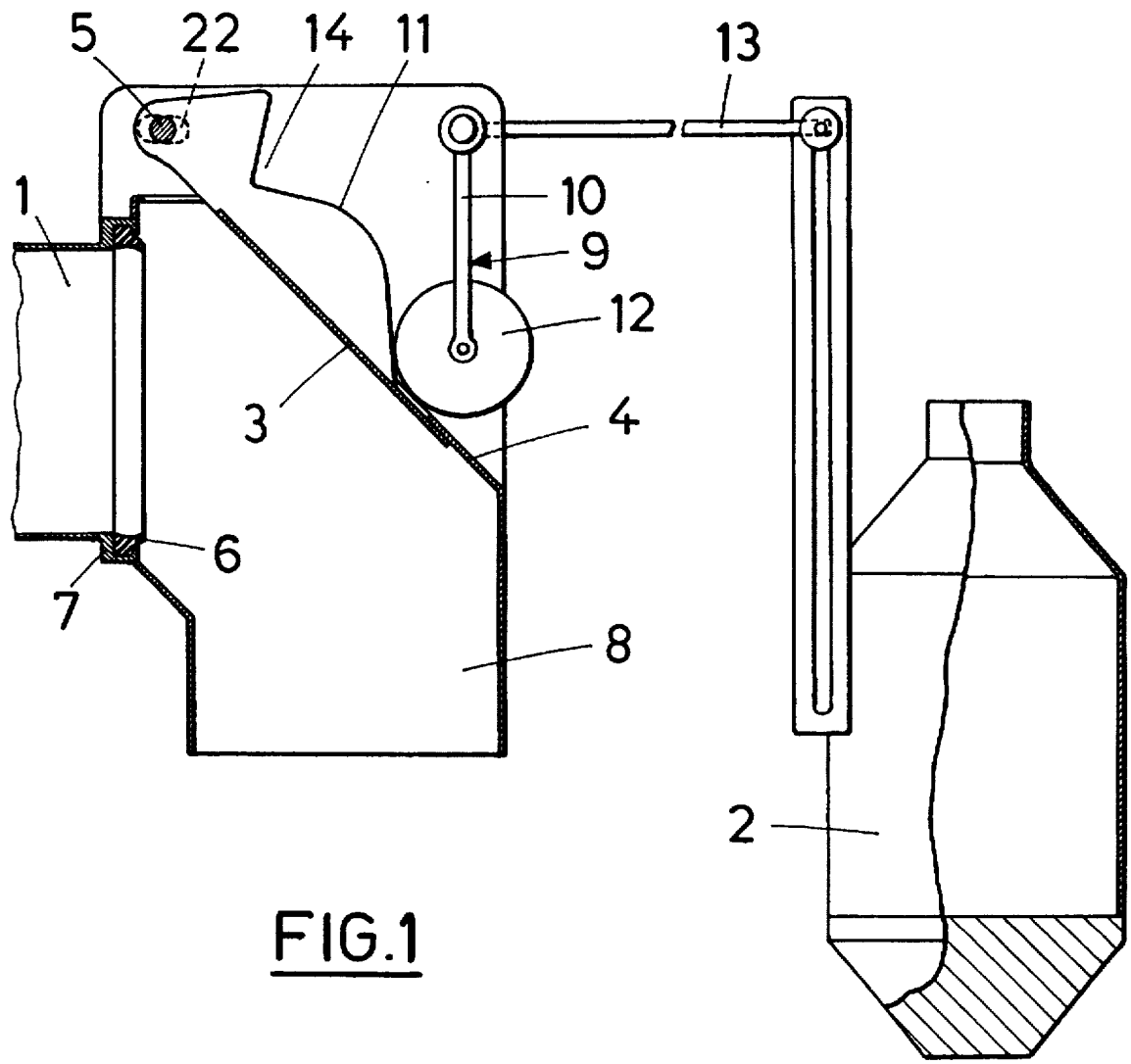

United States Patent [19]
Schlüsselbauer

[11] Patent Number: 5,894,858
[45] Date of Patent: Apr. 20, 1999

[54] DEVICE FOR SHUTTING OFF THE FEED OR DISCHARGE PIPE OF A MOBILITY SEPARATOR

[76] Inventor: Johann Schlüsselbauer, Obergmain 2, 4674 Altenhof am Hausruck, Austria

[21] Appl. No.: 08/844,193

[22] Filed: Apr. 18, 1997

[30] Foreign Application Priority Data

Apr. 22, 1996 [AT] Austria ..................... 724/96

[51] Int. Cl.⁶ ............... F16K 31/24; F16K 33/00
[52] U.S. Cl. .............. 137/448; 137/398; 137/418; 137/446
[58] Field of Search ............... 137/409, 416, 137/418, 445, 446, 448, 397, 398, 443; 251/298, 299

[56] References Cited

U.S. PATENT DOCUMENTS

| | | | |
|---|---|---|---|
| 439,907 | 11/1890 | Stager | 137/398 |
| 547,228 | 10/1895 | Radley | 137/448 |
| 691,444 | 1/1902 | Cecil | 137/448 |
| 782,331 | 2/1905 | Fraser | 137/446 |
| 810,390 | 1/1906 | Bode | 137/448 |
| 945,083 | 1/1910 | Dane | 137/448 |
| 972,331 | 10/1910 | Carson | 137/446 |
| 1,035,663 | 8/1912 | Utley | 137/446 |
| 1,109,582 | 9/1914 | Gorton | 137/446 |
| 1,612,195 | 12/1926 | Kirchhan et al. | 137/448 |
| 1,721,746 | 7/1929 | Pearson | 137/448 |
| 1,832,243 | 11/1931 | Ritchie | 137/448 |
| 1,864,443 | 6/1932 | Khun | 137/448 |
| 2,517,195 | 8/1950 | Gaspar | 137/398 |
| 2,928,410 | 3/1960 | Del Vecchio | 137/448 |
| 3,916,945 | 11/1975 | Bennett | 137/448 |
| 3,974,654 | 8/1976 | Mirto, Jr. | 137/448 |
| 5,031,655 | 7/1991 | Hebaus | 137/448 |

FOREIGN PATENT DOCUMENTS

| | | | |
|---|---|---|---|
| 8782 | 5/1928 | Australia | 137/446 |
| 396 715 | 3/1993 | Austria | . |
| 613935 | 12/1926 | France | 137/397 |
| 222224 | 3/1909 | Germany | 137/446 |
| 817670 | 3/1981 | Russian Federation | 137/398 |
| 146341 | 6/1931 | Switzerland | 137/448 |
| 200353 | 7/1923 | United Kingdom | 137/448 |

*Primary Examiner*—George L. Walton
*Attorney, Agent, or Firm*—Collard & Roe, P.C.

[57] ABSTRACT

There is described a device for shutting off the feed or discharge pipe (1) of a mobility separator, comprising a shutting flap (3) which in dependence on the position of a float (2) can be swivelled from an open position into a closed position about a rotational axis (5) extending transverse to the pipe axis. To create advantageous constructional conditions it is proposed to provide the feed or discharge pipe (1) with a sealing (6) at the end face for the shutting flap (3) pivotally mounted with a radial distance with respect to the feed or discharge pipe (1), where the housing (4) of said shutting flap axially adjoining the feed or discharge pipe (1) constitutes a discharge opening.

7 Claims, 3 Drawing Sheets

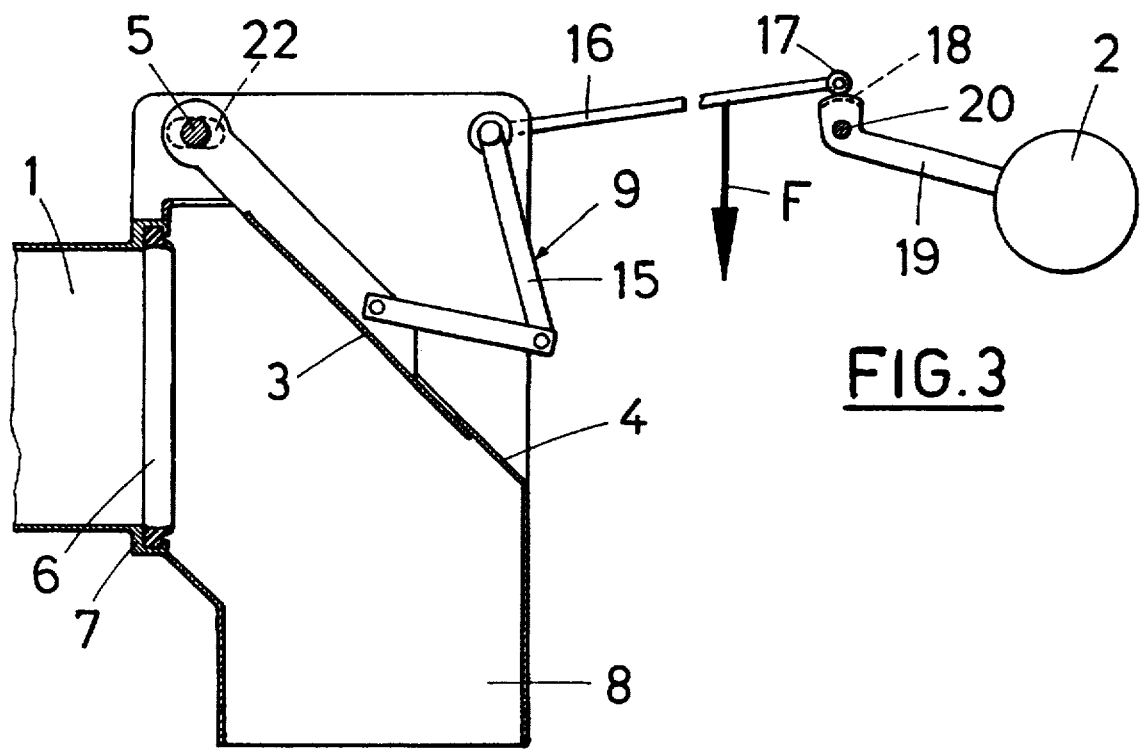
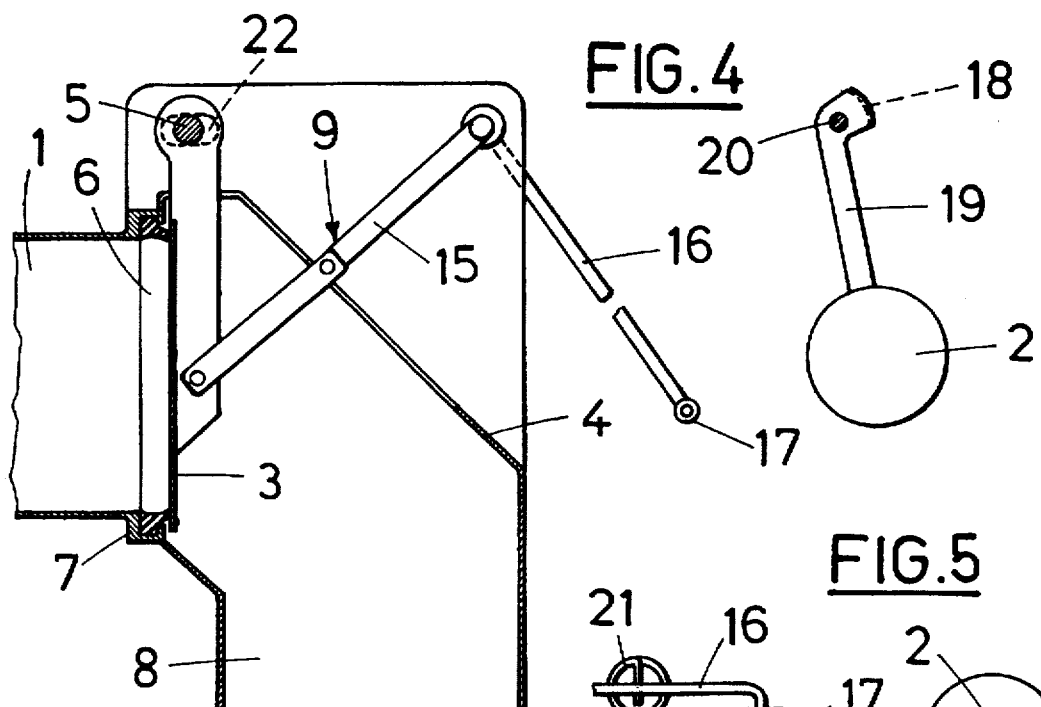
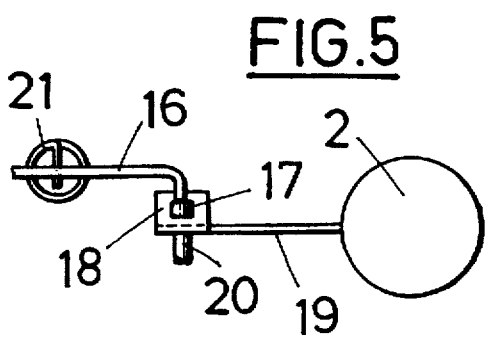

DEVICE FOR SHUTTING OFF THE FEED OR DISCHARGE PIPE OF A MOBILITY SEPARATOR

This invention relates to a device for shutting off the feed or discharge pipe of a mobility separator, comprising a shutting flap, which in dependence on the position of a float can be swivelled from an open position into a closed position about an axis of rotation extending transverse to the pipe axis.

For interrupting the supply of liquid in the case of malfunctions in a mobility separator it is known (AT 396 715 B) to incorporate in the feed pipe a shutting flap which is pivotally mounted about a vertical or horizontal axis and by means of a rod assembly is connected with a float, which is disposed in the vicinity of the cleaned waste water or the separated mobility and in the case of a backpressure blocks the supply of liquid through the feed pipe. This shutting flap forms an elliptical sealing edge, which in the blocking position cooperates with the inner wall of the feed pipe. Although such shutting flaps provide for a simple construction, difficulties may arise as regards their actuation and the sealing effect, because in the vicinity of the axis of rotation of the shutting flap the sealing edge cannot lift off from the inner wall of the feed pipe, so that subsequent to the bearing points of the shutting flap constraining forces must be expected in the vicinity of the sealing edge, so that the ease of movement of the shutting flap is impaired and possibly a complete closure of the feed pipe can be prevented, in particular when impurities in the vicinity of the bearing points of the shutting flap must be anticipated. In this connection it should be considered that the actuating shaft of the shutting flap must extend through the wall of the feed pipe at least on one side.

It is therefore the object underlying the invention to eliminate these deficiencies and develop a device for shutting off the feed pipe of a mobility separator as described above such that despite a simple construction a smooth actuation can be ensured without having to abandon a good sealing effect.

This object is solved by the invention in that at its end face the feed or discharge pipe has a sealing for the shutting flap pivotally mounted with a radial distance with respect to the feed or discharge pipe, where the housing of said shutting flap axially adjoining the feed or discharge pipe forms a discharge opening.

By providing a sealing at the end face of the feed or discharge pipe, the shutting flap can close the feed or discharge pipe from the outside like a cover plate, where due to the sealing axially protruding against the shutting flap and surrounding the feed or discharge pipe, simple sealing conditions ensuring a liquid-tight closure of the pipe are obtained, which are independent of the ease of movement of the shutting flap. Moreover, the arrangement of the sealing at the end face eliminates the risk of impurities depositing in the vicinity of the sealing, which might cause an untight closure of the pipe by the shutting flap, because this sealing at the end face does not form dead flow spaces, which support a deposition of impurities from the liquid flow through the open feed or discharge pipe. Rather, the liquid unimpededly flows out of the housing of the shutting flap through the discharge opening. The radial distance of the axis of rotation of the shutting flap from the feed or discharge pipe in addition creates an essential condition for a largely uniform abutment of the shutting flap on the pipe sealing provided at the end face.

Particularly favorable constructional conditions are obtained when the axis of rotation of the shutting flap is disposed above the feed or discharge pipe in the housing, because in this case the support of the shutting flap cannot be impaired by the liquid in the feed or discharge pipe. When the discharge opening is designed in the form of a downpipe socket, any backpressure of the outflow can easily be prevented.

The closing drive for the shutting flap can be designed in different ways. It must merely be ensured that the shutting flap can be closed against the liquid pressure. For this purpose, the shutting flap can advantageously have a cam track on the side facing away from the sealing for a closing lever preferably designed as roller lever, which can be pivoted by means of the float. When this closing lever is pivoted in closing direction as a result of a corresponding displacement of the float, and is thus moved along the cam track, the shutting flap is closed by means of the closing lever urging against the cam track. The course of the cam track can always be adapted to the most favorable closing moment in dependence on the respective force produced by the closing lever. The closed position of the shutting flap thus actuated can be locked without any particular constructional effort in that the cam track is provided with a locking recess delimiting the closing movement of the closing lever, in which locking recess the closing lever engages in the closed position of the shutting flap in an over-center position. Due to this over-center position of the closing lever any loading of the shutting flap in opening direction produces a torque acting on the closing lever in closing direction, which closing lever is pressed into the locking recess even more firmly, so that the shutting flap can impossibly be opened without pivoting back the closing lever.

For driving the shutting flap there can also be used a toggle lever, which in the closed position has a stop-limited overcenter position, and by means of which the shutting flap is urged against the sealing of the feed or discharge pipe provided at the end face. The stop-limited over-center position of the toggle lever again secures the closed position of the shutting flap against being opened through application of a load on the shutting flap.

As has already been explained above, the radial distance of the axis of rotation of the shutting flap from the sealing of the pipe represents an advantageous condition for a load applied on the sealing largely uniformly over the periphery. In addition, the axis of rotation of the shutting flap can be held in oblong holes of the shutting flap housing extending in the direction of the feed or discharge pipe, so that due to the resulting possibilities for a displacement of the axis of rotation, an automatic compensation of any irregularities, for instance due to the wear of the sealing or manufacturing tolerances, can be obtained.

Figure 2:
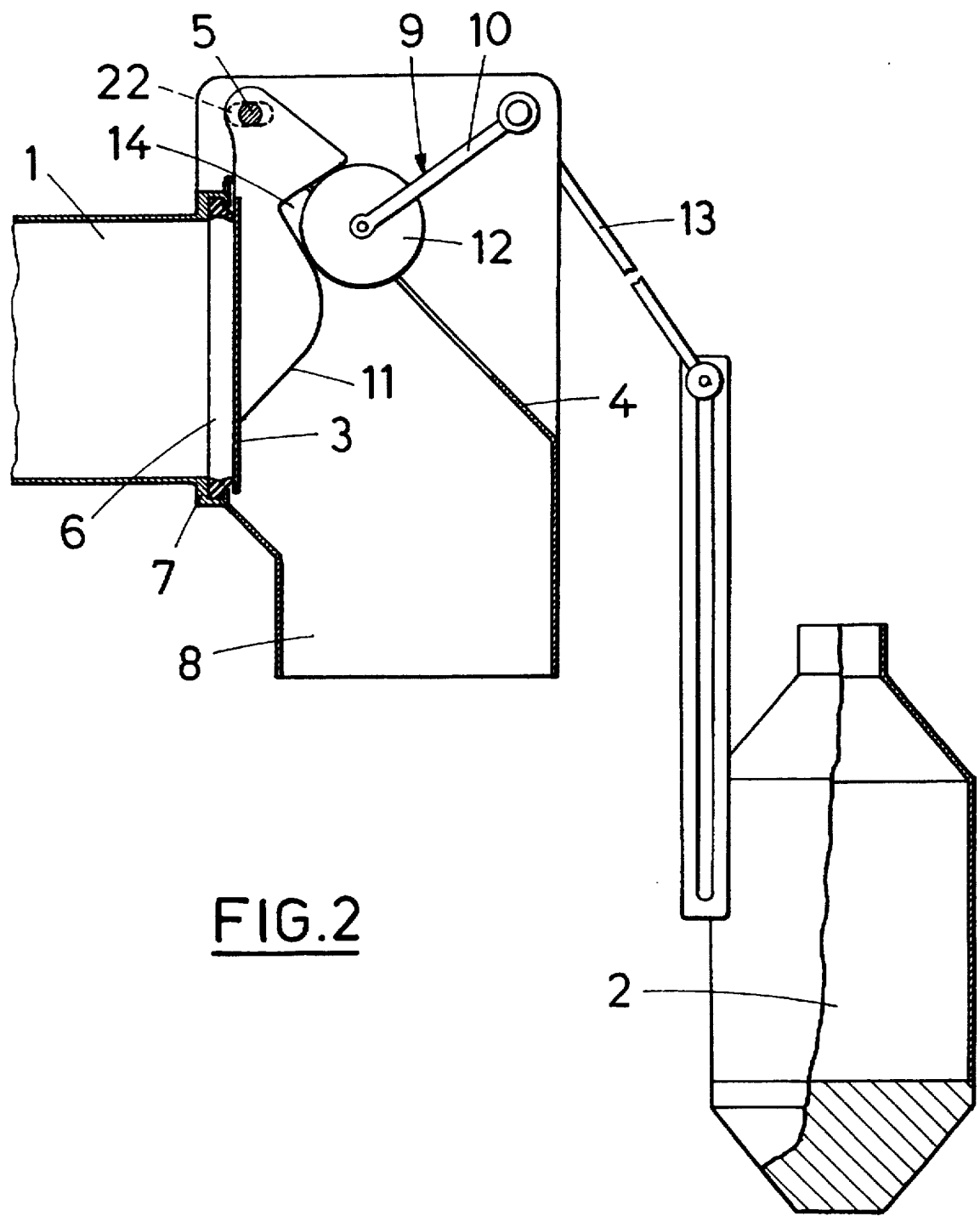

In the drawing, the subject-matter of the invention is represented by way of example, wherein:

FIG. 1 represents an inventive device for shutting off the feed or discharge pipe of a mobility separator in a simplified axial section in the open position, FIG. 2 represents the device in accordance with FIG. 1 in the closed position, FIGS. 3 and 4 show a representation corresponding to FIGS. 1 and 2 of a different embodiment, and FIG. 5 represents segments of the device in accordance with FIG. 3 in a top view of the actuation of the toggle lever by means of a float.

The device in accordance with the represented embodiments has the feed or discharge pipe 1 of a conventional mobility separator not represented in detail, in whose discharge portion a float 2 is provided, by means of which a shutting flap 3 for the feed or discharge pipe 1 can be closed.

This shutting flap 3 is mounted in a housing 4 axially adjoining the feed or discharge pipe 1, so that the rotational axis 5 of the shutting flap 3 extends with a radial distance above the end face of the feed or discharge pipe 1. When closing the shutting flap 3 from the open position represented in FIGS. 1 and 3, the shutting flap 3 is thus urged against the end face of the feed or discharge pipe 1, which in the vicinity of an end flange 7, namely in a ring-shaped recess, carries a ring-shaped sealing 6 axially protruding against the shutting flap 3, so that the inside diameter of the sealing 6 corresponds with the inside diameter of the feed or discharge pipe 1, which at its end face verges into a downpipe socket 8 of the housing 4.

In accordance with the embodiment shown in FIGS. 1 and 2, the closing drive 9 for the shutting flap 3 consists of a closing lever 10, which cooperates with a cam track 11 on the side of the shutting flap 3 facing away from the sealing 6. This closing lever 10, which by means of a roller 12 at its free end constitutes a roller lever, is pivoted by means of an actuating arm 13 connected with the float 2, when due to a correspondingly rising level the float 2 is flooded and drops into the position shown in FIG. 2. The open position of the shutting flap 3 in accordance with FIG. 1 is reached by appropriately subjecting the shutting flap to a weight or spring loading. This is not absolutely necessary, because the flow of liquid in the feed or discharge pipe 1, which flows off through the downpipe socket 8 of the housing 4, can force open the shutting flap 3, which is not loaded in closing direction, against the moment of its own weight.

The swivel movement of the closing lever 10 moved along the cam track 11 effects a closing movement of the shutting flap 3 against the opening moment and the liquid pressure, until the shutting flap 3 is urged against the sealing 6 and tightly closes the feed or discharge pipe 1. At the same time, the roller 12 of the closing lever 10 engages in a locking recess 14 delimiting its closing movement, which locking recess holds the closing lever 10 in an over-center position, so that any opening moment acting on the shutting flap 3 involves a loading of the closing lever in closing direction and thus a firmer retention of the closing lever 10 in the locking recess 14. The resilience required for the engagement of the roller 12 of the closing lever 10 in the locking recess 14 is easily achieved by the elasticity of the sealing 6. For opening the shutting flap 3 from the locked closed position in accordance with FIG. 2 it is therefore necessary to swivel back the closing lever 10 from the locking recess 14.

The closing drive 9 in accordance with the embodiment shown in FIGS. 3 to 5 comprises a toggle lever 15 pivotally mounted on the housing 6 on the one hand and on the shutting flap 3 on the other hand, which toggle lever can be pivoted by means of an actuating arm 16. In the closed position shown in FIG. 4 this toggle lever 15 is in a stop-limited over-center position, which in turn involves a locking of the closed position of the shutting flap 3. In contrast to the closing drive shown in FIGS. 1 and 2, the closing force is not determined by the buoyancy of a float or the weight acting on a flooded float 2, but by a force F acting on the actuating arm 16 as a result of a weight or spring loading. In the illustrated open position in accordance with FIGS. 3 and 5, the actuating arm 16 is supported via a roller 17 on a stop 18, which can be swivelled out of the path of movement of the roller 17 by means of the float 2. For this purpose, the float 2 is pivotally mounted about a rotational axis 20 by means of a two-armed lever 19 constituting the stop 18. When as a result of the movement of the float 2 the stop 18 is swivelled away from the roller 17, the shutting flap 3 is rotated into the closed position due to the weight or spring loading, and is urged against the sealing 6. The actuation of the shutting flap is therefore independent of the force of the float. In FIG. 5 a coil spring 21 is indicated, which is used for applying the force F to the actuating arm 16.

To provide for a uniform abutment of the shutting flap 3 against the sealing 6, the rotational axis 5 of the shutting flap 3 may be held in oblong holes 22 of the housing 4, so that an automatic compensation of manufacturing tolerances and wear is obtained, when the shutting flap 3 is urged against the sealing 6 by means of the closing drive 9.

What is claimed is:

1. A device for shutting off a flow of liquid flowing through a pipe of a light liquid separator in a flow direction towards an outlet end of the pipe, the pipe having a substantially horizontally extending axis and an inner diameter, which comprises:

(a) a shut-off flap pivotal from an open position into a closed position in dependence on the position of a float about an axis which is radially spaced from, and above, the pipe and extends transversely to the pipe axis, (b) means for pivoting and locking the shut-off flap in an over dead center position in the closed position along at least an outer surface portion of said shut-off flap, (c) a housing axially adjoining the outlet end, the transversely extending shut-off flap axis being mounted in the housing, and the housing comprising (1) a downpipe defining a discharge opening for discharging liquid flowing in the flow direction through the outlet end of the pipe in the open position of the shut-off flap towards a face of the shut-off flap facing the outlet end, and (d) an annular gasket at the outlet end of the pipe.

2. The device of claim 1, wherein the annular gasket axially protrudes from the outlet end and has an inner diameter no smaller than the inner diameter of the pipe.

3. The device of claim 1, further comprising a cam track on a face of the shut-off flap facing away from the outlet end of the pipe, and a closing lever pivotal by the float and engaging the cam track.

4. The device of claim 3, wherein an end of the closing lever carries a roller engaging the cam track.

5. The device of claim 1, further comprising a toggle lever connecting the shut-off flap to the float, the toggle lever assuming an over dead center position in the closed position of the shut-off flap.

6. The device of claim 1, wherein the shut-off flap axis is journaled in oblong bearing holes extending in the direction of the pipe axis.

7. A device for shutting off a flow of liquid flowing through a pipe of a light liquid separator in a flow direction towards an outlet end of the pipe, the pipe having a substantially horizontally extending axis and an inner diameter, which comprises:

(a) a shut-off flap pivotal from an open position into a closed position in dependence on the position of a float about an axis which is radially spaced from, and above, the pipe and extends transversely to the pipe axis, (b) a housing axially adjoining the outlet end, the transversely extending shut-off flap axis being mounted in the housing, and the housing comprising (1) a downpipe defining a discharge opening for discharging liquid flowing in the flow direction through the outlet end of the pipe in the open position of the shut-off flap towards a face of the shut-off flap facing the outlet end, (c) an annular gasket at the outlet end of the pipe, (d) a cam track on a face of the shut-off flap facing away from the outlet end of the pipe, and (e) a closing lever pivotal by the float and engaging the cam track,
 (1) the cam track defining a locking recess delimiting the closing movement of the closing lever, and
 (2) the closing lever engaging the locking recess in the closed position in an over dead center position.

* * * * *